INVENTORS
GORDON RALPH BROWN
ROBERT W. KEARNS
KENNETH JAMES LAW
BY
*Lane & Aitken*
ATTORNEYS July 5, 1966  G. R. BROWN ETAL  3,259,706
MAGNETICALLY ACTUATED CONTROL DEVICE
Filed Jan. 30, 1962  3 Sheets-Sheet 3
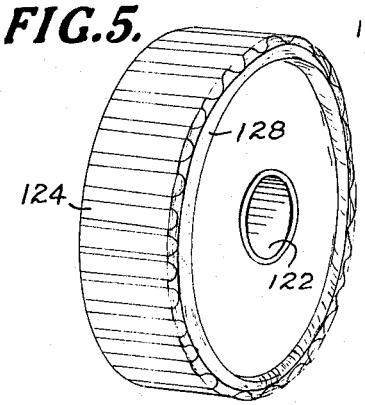
FIG.5.
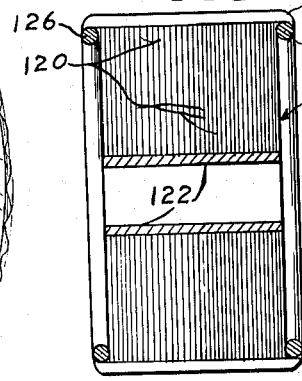
FIG.6.
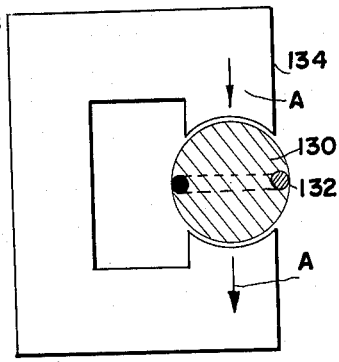
FIG.7.
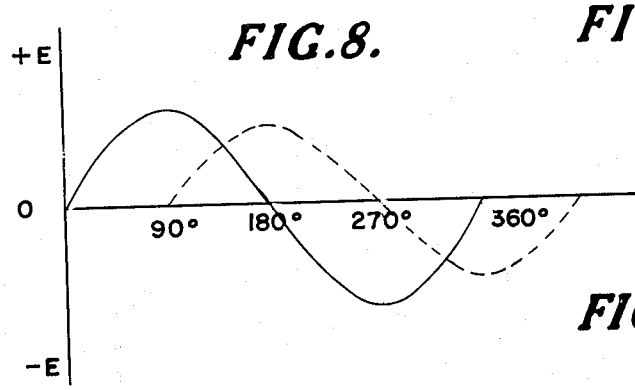
FIG.8.
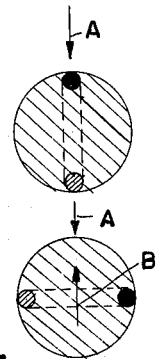
FIG.9.
FIG.10.
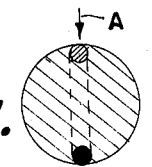
FIG.11.
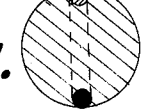
FIG.12.
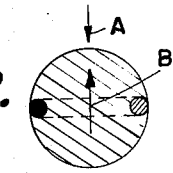
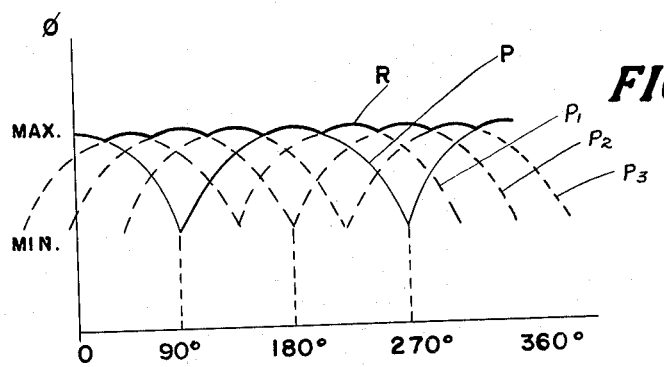
FIG.13.
INVENTORS
GORDON RALPH BROWN
ROBERT W. KEARNS
KENNETH JAMES LAW
BY
Lane & Aitken
ATTORNEYS

# United States Patent Office 3,259,706
Patented July 5, 1966

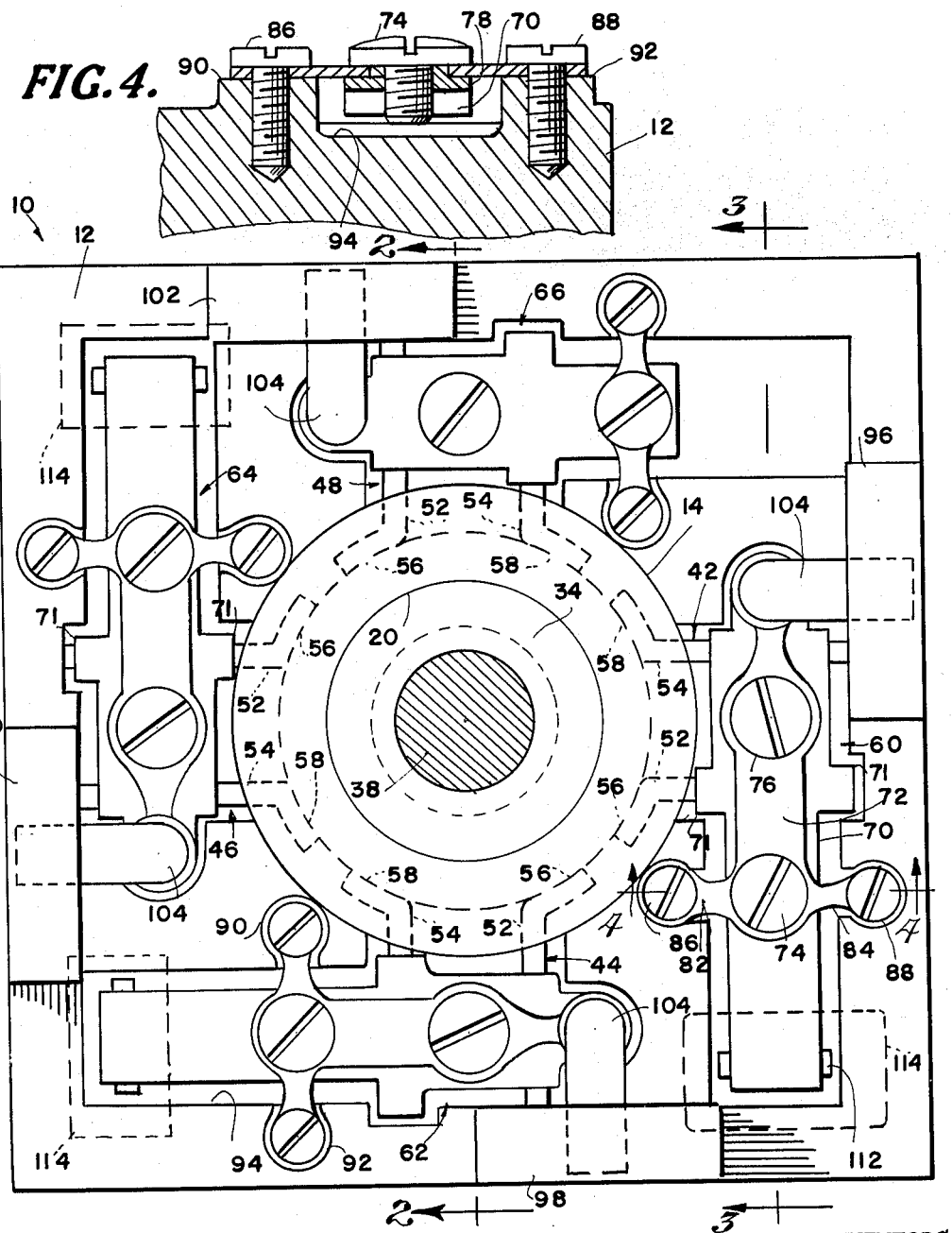

3,259,706
MAGNETICALLY ACTUATED CONTROL DEVICE
Gordon Ralph Brown, Garden City, and Robert W. Kearns and Kenneth J. Law, Detroit, Mich., assignors to Tann Corporation, Detroit, Mich., a corporation of Michigan
Filed Jan. 30, 1962, Ser. No. 169,797
14 Claims. (Cl. 200—61.46)

This invention relates to magnetically actuated control devices, and more particularly to a control device actuated by a change in a magnetic field caused by a generator cutting the lines of flux in the field in a manner to produce a magneto-motive force in opposition to the lines of flux.

In accordance with one embodiment of the present invention, a magnetic unit is provided having an air gap with a substantially constant number of lines of flux passing thereacross. A generator is positioned in the air gap and driven in a manner to cut the lines of flux to produce a magnetomotive force (hereinafter referred to as M.M.F.) in opposition thereto. Suitable control means are associated with the magnetic unit in a manner to be actuated in response to the reduction in the number of lines of flux across the air gap caused by the opposing M.M.F. As the speed of movement of the generator increases, the opposing M.M.F. increases to decrease the flux across the air gap to actuate the control means.

The control means actuated in response to the change in the number of lines of flux can be utilized in a number of different ways, such as, for example, to provide an indication of the speed of movement of the M.M.F. generator. To accomplish this the M.M.F. generator can take the form of a rotor having electrical conductors positioned thereabout to cut the lines of flux across the air gap as the rotor rotates. The faster the rotor rotates, the faster the conductors cut the lines of flux and the larger the current induced in the conductors. The current in the conductors, in turn, produces the M.M.F. which begins to significantly oppose the lines of flux across the air gap when the r.p.m. of the rotor reaches a certain value. When the r.p.m. of the rotor is increased beyond this point, the opposing M.M.F. increases to produce a corresponding decrease in the lines of flux across the air gap. This net reduction in the lines of flux across the air gap can be suitably detected by the control means to provide an indication of the speed of rotation of the rotor. With this arrangement the rotor can be driven by an electric motor, for example, and the control means will effectively provide an indication of the r.p.m. of the motor.

Therefore it is one object of the invention to provide a control device actuated in response to a change in a magnetic field caused by an M.M.F. generator cutting the lines of flux of the field to produce an M.M.F. in opposition thereto.

It is another object of the invention to provide a generator for producing a changeable M.M.F. in opposition to flux across an air gap in a manner to reduce the number of lines of flux across the air gap.

It is a further object of the invention to provide a generator for producing a changeable M.M.F. in opposition to lines of flux passing thereacross and also to provide means for detecting the net reduction in the number of lines of flux across the generator caused by the opposing M.M.F.

It is a still further object of the invention to provide a control device of the type described above wherein the M.M.F. generator comprises an electrical conductor positioned on a magnetically permeable core, the core serving to concentrate a maximum number of lines of flux therein prior to movement of the generator, and the electrical conductor producing an opposing M.M.F. in the core to reduce the number of lines of flux in the core when the generator is moved so as to cause the conductor to cut the lines of flux.

It is a still further object of the invention to provide a magnetic unit having an air gap configuration with an M.M.F. generator rotatably mounted in one portion of the air gap configuration and detecting means positioned in another portion of the air gap configuration wherein the generator produces an opposing M.M.F. which in effect increases the reluctance of said one portion of the air gap to reduce the number of lines of flux thereacross and increases the number of lines of flux across said other portion of the air gap which is detected by said detecting means.

It is a still further object of the invention to provide a speed sensing device comprising an M.M.F. generator rotatably mounted in the air gap of a magnetic unit in a manner to produce an increasing M.M.F. in opposition to the lines of flux across the air gap as the r.p.m. of the generator increases and having detecting means actuated in response to the change in the number of lines of flux across the air gap to provide an indication of the r.p.m. of the generator.

It is a still further object of the invention to provide a cylindrical rotor adapted to be rotatably mounted in an air gap having a fixed number of lines of flux thereacross to generate an opposing M.M.F., the rotor comprising a laminated core of magnetic permeable material having a plurality of circumferentially spaced, axially extending electrical conductors on the periphery thereof and a conducting ring on each end thereof electrically interconnecting the corresponding ends of the conductors.

Other objects and features of novelty of the present invention will be specifically pointed out or will otherwise become apparent when referring, for a better understanding of the invention, to the following description taken in conjunction with the accompanying drawings, wherein:

FIG. 1 is a plan view of a control device embodying features of the present invention;

FIG. 4 is a sectional view taken along the line 4—4 of FIG. 1;

FIG. 5 is a perspective view of the rotor of the control device illustrated in FIG. 1;

FIG. 6 is a sectional view taken on the line 6—6 of FIG. 5;

FIG. 7 is a schematic view of a simplified embodiment of the present invention;

FIG. 8 is a graph illustrating the curves followed by the induced E.M.F. and current generated by the embodiment illustrated in FIG. 7;

FIG. 9 is a view of the rotor illustrated in FIG. 7 after it has rotated 90°;

FIG. 10 is a view of the rotor illustrated in FIG. 7 after it has rotated 180°;

FIG. 11 is a view of the rotor illustrated in FIG. 7 after it has rotated 270°;

FIG. 12 is a view of the rotor illustrated in FIG. 7 after it has rotated 360°; and FIG. 13 is a graph illustrating the variation in the pole flux produced by the embodiment illustrated in FIG. 7.

Figure 3:
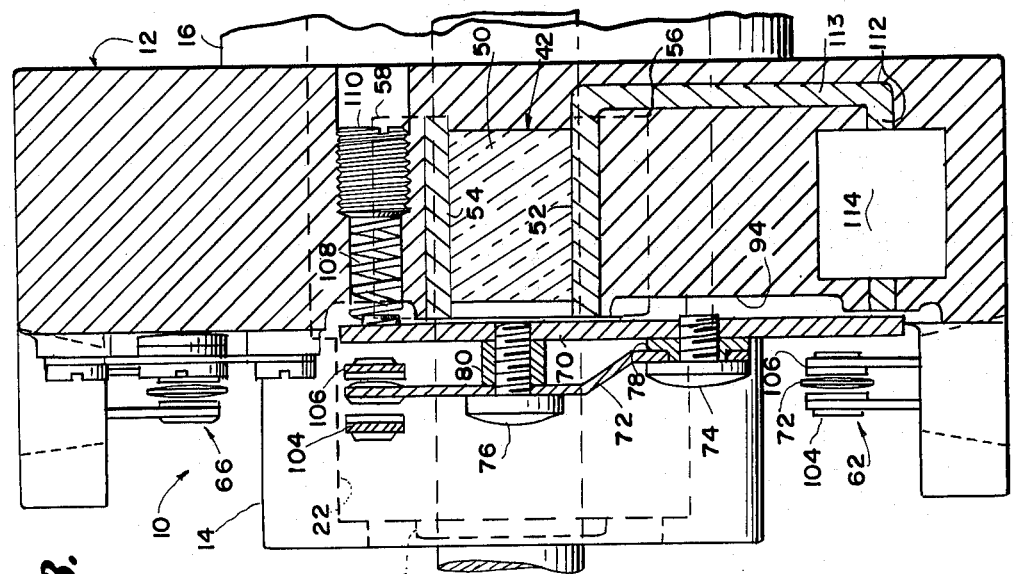
FIG. 3 is a sectional view taken along the line 3—3 of FIG. 1.
Figure 2:
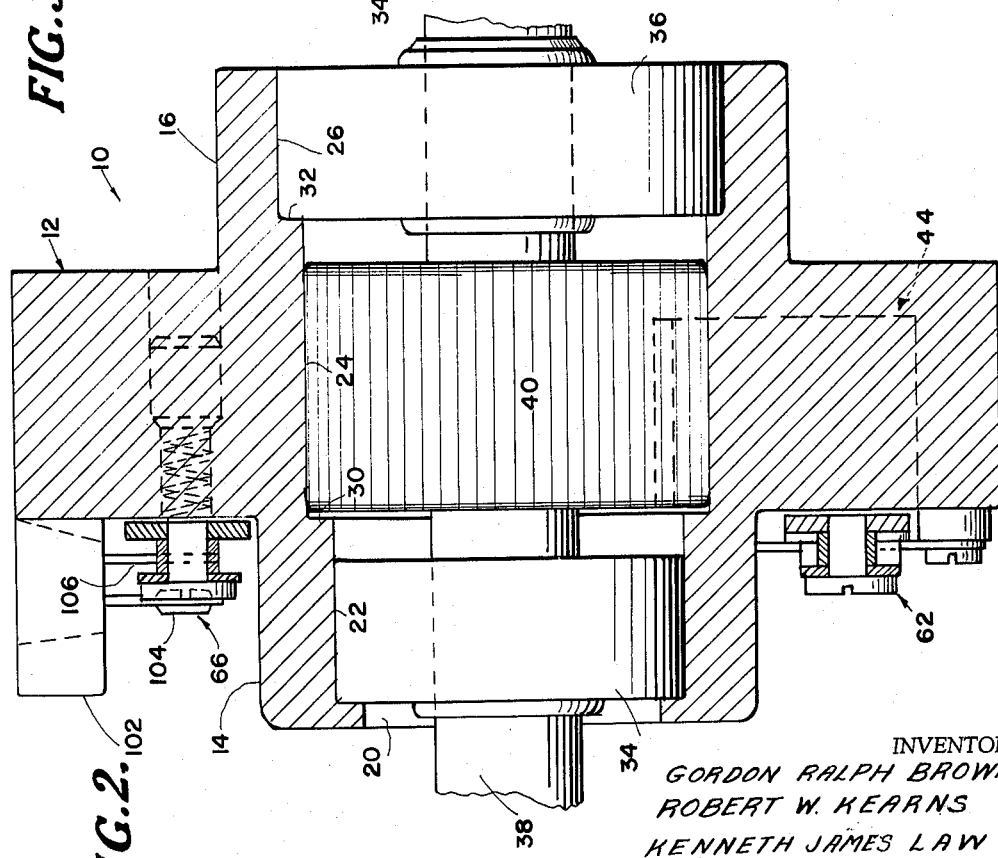
FIG. 2 is a sectional view taken along the line 2—2 of FIG. 1.

Referring to FIGS. 1–4, a control device 10 embodying features of the present invention is illustrated which comprises a body 12 preferably made of a suitable non-magnetic material. The body 12 has a boss 14 projecting from the left face thereof as viewed in FIG. 2 and a boss 16 projecting from the right face thereof with a central bore 20 extending therethrough. The bore 20 is divided into three sections 22, 24 and 26 of increasing diameter formed by annular shoulders 28, 30 and 32, respectively.

Suitable bearings 34 and 36 are press fit in the sections 22 and 26 respectively and a shaft 38 is rotatably journaled in the central bore 20 by the bearings. A rotor 40 embodying important features of the present invention is fixed to the shaft 38 between the bearings so as to be mounted for rotation within the central section 24. In the particular control device 10 as illustrated in FIGS. 1–4, four magnetic units 42, 44, 46 and 48 are embedded in the body 12 in circumferentially spaced relation about the rotor 40. Each of the magnetic units 42–48 comprises a magnet 50 having pole pieces 52 and 54 of suitable magnetic permeable material such as iron secured to the opposite poles thereof so that one of the pole pieces is completely magnetized as a north pole and the other piece is completely magnetized as a south pole. The magnet 50 is preferably made by powder metallurgy techniques since it is a relatively small magnet. A ceramic magnet sold under the trade name Indox has proved to be particularly effective. As viewed in FIG. 3, the magnet 50 is polarized along a vertical line so that the upper face thereof forms one pole of the magnet and the lower face thereof forms the other. The left edges of the pole pieces 52 and 54 open on the left face of the body 12 adjacent to the boss 14, and the radially inner ends thereof extend beneath the boss 14 and are flared outwardly as most clearly illustrated in FIG. 1 to provide arcuate end portions 56 and 58, respectively, which closely overlie the cylindrical surface of the rotor 40.

Electrical switches 60, 62, 64 and 66 are mounted on the left face of the body 12 in position to be actuated by each of the magnetic units 42–48, respectively. Each of the switches is the same with the exception of a minor difference in the switch 66 which will be described. Therefore only the construction of the switch 60 will be described in detail, and it will be understood that the description of this switch applies equally to each of the other switches. Referring specifically to FIGS. 1, 3 and 4, the switch 60 comprises an arm 70 of suitable magnetic permeable material such as iron having a contact blade 72 suitably secured thereon such as by screws 74 and 76 with suitable electrically insulating spacers 78 and 80 therebetween, respectively. One end of the contact blade 72 has laterally projecting arms 82 and 84 having the ends thereof secured to the face of the body 12 by screws 86 and 88 to act as torsion arms for pivotally mounting the arm 70 on the body 12. The lateral arms 86 and 88 are supported on bosses 90 and 92, as most clearly illustrated in FIG. 4, and the face of the body 12 is provided with a recess 94 beneath the arm 70 so as to provide clearance for the small pivotal movement of the arm 70, as will be described.

Posts 96, 98, 100 and 102 project upwardly from the edges of the body 12 adjacent to the pivoting end of each of the arms 70 and have fixed contacts 102 and 104 projecting therefrom on opposite sides of the pivoting end of the contact blade 72. In the position illustrated in FIG. 3, the contact blade 72 engages the contact 106 so as to close a circuit (not shown) that may be connected to the terminal provided by the screw 74 and the terminal provided by the contact 106. The arm 70 is magnetically held in the position illustrated in FIG. 3 by the pole pieces 52 and 54 since it closely overlies the left edges thereof so as to bridge the air gap therebetween. However, when the flux attracting the arm 70 to this position is weakened by the rotor 40, as will be described in greater detail hereinafter, a spring 108 positioned in the body 12 beneath the end of the arm 70 overcomes the weakened magnetic force and pivots the arm 70 in a counter-clockwise direction as viewed in FIG. 3 to move the contact blade into engagement with the contact 104 to break the circuit connected to the contact 106 and make a circuit (not shown) which may be connected to the contact 104. A suitable set screw 110, threadably mounted in the body 12, is positioned in engagement with one end of the spring 108 to provide an adjustment for varying the force with which the spring acts on the arm 70.

As most clearly illustrated in FIGS. 1 and 3, the ends of the arms 70 of each of the switches 60, 62 and 64 furthest removed from the magnetic units overlie the exposed end of a core 112 of suitable magnetic permeable material surrounded by a coil 114 embedded in the body 12. The core is connected to the pole piece 52 associated therewith by a connecting portion 113 to provide a continuous iron path from the center of the coil 114 to the pole piece 52. With this construction, each of the coils 114 can be selectively energized by suitable circuits (not shown) to pivot the arm 70 associated therewith in a counter-clockwise direction to engage the contact blade 72 with the contact 104 and to lock the arm in this position so that the magnetic unit cannot have any effect on the arm until the coil 114 is de-energized. It will also be observed in FIG. 1 that the arm 70 has flanges 71 projecting laterally therefrom overlying the pole piece 52 to increase the effective area of the pole piece. The rotor 40 is more clearly illustrated in FIGS. 5 and 6 and comprises a washer-shaped, laminated core 120 made up from a plurality of thin washer-shaped laminations secured together about a bushing 122. The laminated core is made of a suitable magnetically permeable material such as, for example, a 4% silicon steel. The periphery of the laminated core 120 has a plurality of axially extending circumferentially spaced notches which are filled with a suitable electrically conducting non-magnetic permeable material such as copper or zinc to form conductors 124 having their ends interconnected by conducting rings 126 and 128 of similar material.

With this construction, the core 120 of magnetic permeable material shunts the arcuate ends 56 and 58 of each of the magnetic units 42–48 to weaken the flux acting on the arms 70 a sufficient amount to enable the springs 108 to pivot the arms to engage the contact blades 72 with the contacts 104. However, when the shaft 38 is rotated at a sufficient r.p.m. the rotor will generate a magneto-motive force in opposition to each of the magnetic units 42–48 due to the cutting of the lines of flux between the arcuate ends 56 and 58 by the conductors 124. This opposing M.M.F. reduces the flux passing between the arcuate ends 56 and 58 and this, in effect, may be viewed as increasing the reluctance between the arcuate ends 56 and 58 of each of the magnetic units. Because of this more flux acts on the arms 70 and as the speed of rotation of the shaft 38 increases still further, the opposing M.M.F. increases until the reluctance between the arcuate ends has increased a sufficient amount to increase the flux acting on the arms 70 sufficiently to overcome the springs 108 and pivot the arms 70 as previously described. Thus by adjusting the spring force applied by the various springs 108, or varying other parameters, as will be described in greater detail hereinafter, each of the switches 60–66 will trip at a different r.p.m. of the shaft 38 to give an electrical indication that the specific r.p.m. has been reached, which indication can be utilized in various manners. For example, if the control device 10 is used in connection with an electric motor and the shaft 38 is either the output shaft of the motor or driven thereby, one of the switches can be set to trip at a predetermined r.p.m. of the shaft and connected to the starting windings of the motor to de-energize the starting windings when the motor shaft reaches the predetermined r.p.m. If it is desired to de-activate a switch or lock it out for any other reason, the coil 114 associated with that particular switch can be energized to hold the contact blade 72 in engagement with the contact 104 so that it will not trip back when the attraction of the magnet exceeds the force of the spring 108. If desired, the coils 114 can be connected to be controlled by the other switches to provide a predetermined sequential actuation. If the added versatility represented by the coils 114 is not needed, they can be eliminated and the ends of the arms 70 cut off as illustrated by arm 70 of the switch 66 of FIG. 1. From the foregoing it can be seen that the control device 10 can function admirably as a speed sensing device with one or more of the switches 60–66 provided as desired.

As stated previously, the r.p.m. of the shaft 38 at which one of the switches will be actuated can be varied by adjusting the set screw 110 (FIG. 3) to determine the force the spring 108 exerts on the arm 70. This point of actuation can also be changed in other ways, such as by varying the minimum air gap spacing between the arm 70 and the exposed edges of the pole pieces 52 and 54 when in the position illustrated in FIG. 3, changing the material of the core 120 or conductors 124, changing the thickness of the laminations of the core or the cross-sectional area of the conductors 124, changing the number of conductors about the periphery of the core, changing the dimensions of the core, and so forth. In the specific embodiment illustrated wherein the core 120 is made of 4% silicon steel, it has a diameter of one inch and an axial length of five-eighths of an inch. Each of the laminations are .010 inch thick and the conductors are copper wires having a diameter of .160 inch. In tests conducted on the control device, it was found that as the conductors were reduced in size, a higher r.p.m. of the shaft was required to generate equivalent opposing M.M.F's. Stated otherwise, with all other factors remaining constant, the shaft would have to rotate at a higher r.p.m. to trip the same switch. It was further discovered that the shaft had to rotate at a certain r.p.m. before a significant opposing M.M.F. was generated and that at this point a phase change appeared to take place, after which the opposing M.M.F. increased as the r.p.m. of the shaft increased. It was also discovered that when the shaft reached a certain high r.p.m., the opposing M.M.F. stopped increasing and began to decrease with increasing shaft speeds and that this reversal was determined by the thickness of the laminations employed in the laminated core 120. The thicker the laminations, the lower the shaft r.p.m. at which this reversal takes place.

In order to ensure the maximum concentration of flux between the arcuate ends 56 and 58 of each magnetic unit, the pole pieces of the adjacent magnetic units are preferably reversed. For example, if the pole piece 52 of the magnetic unit 42 is a north pole piece and the pole piece 54 is a south pole, the pole pieces 52 and 54 of the magnetic unit 44 are reversed so that the north pole piece 52 is adjacent to the north pole piece 52 of the magnetic unit 42, and the pole pieces 52 and 54 of the magnetic unit 48 are oriented so that the south pole piece 54 is adjacent to the south pole piece 54 of the magentic unit 42. The pole pieces of the magnetic unit 46 are similarly oriented so that the pole piece 52 thereof is adjacent to the pole piece 52 of the magnetic unit 48 and the pole piece 54 thereof is adjacent to the pole piece 54 of the magnetic unit 44. With this arrangement the lines of flux of each of the magnetic units will pass between the pole pieces thereof and will not link with the adjacent pole pieces of the adjacent magnetic units.

As the conductors 124 of the armature move between the arcuate ends of a magnetic unit they cut the lines of flux therebetween so as to induce a current in the conductors. The conductors then generate their own magnetic field which, when the r.p.m. of the shaft 38 reaches a predetermined value, will begin to increasingly oppose the flux between the arcuate ends as previously stated. The conducting rings 126 and 128 on the armature electrically connect each of the conductors 124 so that the current induced in the conductors in this manner has a closed circuit path. From the foregoing it is apparent that the opposing M.M.F. generated by the rotor with respect to each of the magnetic units 42–48 will depend on the rate at which the conductors 124 cut the lines of flux between each pair of arcuate ends. This rate, in turn, not only depends on the r.p.m. of the shaft 38 but also depends on the number of conductors that are provided about the periphery of the armature. From this it is apparent that with all the factors equal, an increase in the number of conductors 124 will decrease the r.p.m. of the shaft 38 at which the switches will be actuated. In the control device 10 illustrated in the drawings, twenty-four conductors 124 are equally spaced about the periphery of the rotor 40.

Referring to FIG. 7, a simplified version of the present invention is illustrated which is believed to illustrate the principle behind the present invention. A rotor 130 similar to the rotor 40 but having a single conductor 132 completely wound about the diameter thereof in a closed loop is rotatably mounted in the air gap between the ends of a C-shaped magnet 134 which provides a fixed number of lines of flux passing across the air gap and through the magnetic permeable material of the rotor 130. Assuming that the flux provided by the magnet 134 passes from the poles thereof across the air gap in the direction of the arrows A, the conductor 132 will cut these lines of flux as the rotor rotates and generate an induced sinusoidal E.M.F., as illustrated by the curve of induced voltage E in FIG. 8 wherein the angular position of the conductor 132 is plotted on the axis of the abscissas of the graph and the magnitude of the induced E.M.F. is plotted on the axis of the ordinates. The induced E.M.F. generates a sinusoidal current in the conductor which, in turn, establishes its own magnetic field in the rotor 130 perpendicular to the plane defined by the conductor 132 and in phase with the sinusoidal current. When the conductor 132 has rotated through 90° the induced E.M.F. increases to its maximum, decreases to 0 at the 180° position, increases to a maximum negative value at 270° and returns to 0 at 360°, its original position as ilustrated in FIG. 7. Of course, as the r.p.m. of the rotor increases the amplitude of the curve in FIG. 8 will increase and as the r.p.m. decreases the amplitude will decrease.

The rotor magnetic field initially has a direction perpendicular to the plane of the conductor 132, and therefore it is apparent that it will not provide much opposition to the lines of flux from the magnet 134, hereinafter referred to as pole flux A, since the maximum magnetic field is at the 90° and 270° positions. At these positions the plane of the conductor 132 is parallel with the pole flux A and therefore the rotor magnetic field is perpendicular to these lines of flux. However, as the r.p.m. of the rotor increases, a phase change takes place as previously stated and the direction of the rotor magnetic field shifts to more effectively oppose the pole flux A so that the net flux passing between the pole faces in the direction of the arrows A decreases with increasing r.p.m. Thus the rotor, in effect, increases the reluctance of the air gap between the pole faces as previously mentioned so as to decrease the flux passing across the air gap. Translating this to the control device 10 as illustrated in FIG. 1, as the r.p.m. of the rotor 40 increases, the reluctance in the gap between the arcuate ends 56 and 58 of the magnetic unit 42 increases. Therefore fewer lines of flux pass between these ends and more lines of flux will act on the arm 70 until the force on the arm is large enough to overcome the spring 108 and attract the arm to the position illustrated in FIG. 3. When the r.p.m. of the rotor 40 decreases sufficiently, or when it stops rotating completely, more lines of flux will pass between the arcuate ends 56 and 58 through the magnetic permeable material of the rotor to reduce the flux acting on the arm 70 sufficiently to enable the spring 108 to pivot the arm to move the contact blade 72 into engagement with the contact 104.

As stated previously, the pole flux A passing across the air gap through the rotor 130 does not decrease appreciably until the r.p.m. of the rotor reaches a certain minimum value, and a phase change take places. Thereafter the pole flux A decreases as the rotor r.p.m. increases. This phase change is believed to be caused by the current in the conductor 132 lagging behind the induced E.M.F. as represented by the curve E of FIG. 8. When the current does not lag appreciably behind the curve E, the pole flux A does not decrease significantly with increasing rotor r.p.m.. But if the r.p.m. of the rotor 130 is such that the current in the conductor 132 lags 90° behind the induced E.M.F as illustrated by the curve I in FIG. 8, the vector of the opposing magnetic field would be such as to provide maximum opposition to the pole flux A.

This can be most clearly understood by reference to FIGS. 9–12 wherein the rotor 130 is illustrated in four different positions 90° apart from one another with the pole flux A passing therethough as indicated by the arrows A. In these figures, one leg of the conductor 132 extending axially along the cylindrical wall of the rotor 130 is shown as a dot and the other as a circle. When the conductor is in the position illustrated in FIG. 9, which is 90° from the position illustrated in FIG. 7, it can be seen from the curve I of FIG. 8 that the current in the conductor passes through zero and, therefore, the magnetic field produced by the current is likewise zero. However, when the conductor rotates an additional 90° to the 180° position illustrated in FIG. 10, the current reaches a maximum value, and the magnetic field has a maximum value with a direction indicated by the arrow B directly opposing the pole flux A. When the conductor reaches the 270° position as illustrated in FIG. 11, the current and magnetic field again pass through zero, and when it reaches the 360° position, the current and magnetic field have their maximum value in the direction indicated by the arrow B. In the 360° position it will be observed that the direction of the rotor magnetic field is reversed relative to the rotor, but since the rotor has rotated through 180° the magnetic field still opposes the pole flux A.

From this it is apparent that the magnetic field or opposing M.M.F. generated in the rotor will follow a sinusoidal curve in phase with the current curve I of FIG. 8, and that the pole flux A will follow the curve P illustrated in FIG. 13 which has a maximum value at the 180° position when the opposing rotor M.M.F. passes through zero and a minimum positive value at the 90° and 270° positions when the rotor M.M.F. has a maximum value. Of course the curve P can be smoothed out by winding additional conductors about the rotor 130. For example, assuming that three additional conductors 132 are wound about the rotor 130 in equally spaced relation, they would each alter the pole flux A as illustrated by the curves P₁, P₂ and P₃ in FIG. 13 and would cooperate with the curve P to produce a pole flux A that would follow the composite curve R illustrated in FIG. 13 which varies only slightly from the maximum value of each individual curve.

Of course in the control device 10 as illustrated in FIG. 1 the flux between each pair of arcuate ends 56 and 58, which is the equivalent of the pole flux A in the foregoing simplified description, only passes across a portion of the periphery of the rotor 40. Therefore the geometry of the control device 10 differs from the simplified construction of FIG. 7, but it is believed that the principle of operation is clearly analogous. It might be specifically noted, however, that the current induced in each of the conductors 124 cutting the lines of flux between a particular pair of arcuate ends 56 and 58 passes in one of two directions. The current passes in one direction through the conductors 124 on one side of the midpoint between the arcuate ends and in the opposite direction in the conductors on the other side of the midpoint. Since the ends of each of these conductors are electrically connected by the conducting rings 126 and 128, a plurality of closed, parallel connected loops or current paths are continuously provided in the flux path between each pair of arcuate ends.

While it will be apparent that the embodiments of the invention disclosed herein are well calculated to fulfill the objects of the invention, it will be appreciated that the invention is susceptible to modification, variation and change without departing from the proper scope or fair meaning of the subjoined claims. For example, it is apparent that other devices, such as valve mechanisms, or latch release devices, could be actuated in place of the switches 60–66. Or, if desired, the magnetic field about the rotor 40 could be provided by a magnet shaped similar to the magnet 134 in FIG. 7 and a pickup coil wound thereabout to pick up the flux changes caused by the rotor. In such an arrangement the varying current in the coil could be amplified, filtered and displayed in a manner to provide a direct indication of the rotor r.p.m.

What is claimed is:

1. An electric control device comprising magnetic means for producing lines of flux, an M.M.F. generator positioned in said lines of flux, said M.M.F. generator comprising an electrical conductor and a magnetically permeable core, means for moving said conductor and lines of flux relative to one another to produce an M.M.F. in opposition to said magnetic means, and means linked with said lines of flux for detecting the variation in the number thereof.

2. An electric control device comprising magnetic means for generating lines of flux across an air gap configuration, armature means in one portion of said air gap configuration so as to be magnetically attracted toward a first position against a force normally biasing it to a second position, and changeable flux producing means in another portion of said air gap configuration for producing an opposing M.M.F. which reduces the number of lines of flux in said other portion of the air gap configuration when the opposing M.M.F. reaches a predetermined value and increases the number of lines of flux in said one portion a sufficient amount to attract said armature to said first position, and when the number of lines of flux in said other portion is reduced a sufficient amount by the reduction of said opposing M.M.F., said biasing force moving said armature means to said second position.

3. An electric control device comprising magnetic means for generating lines of flux across an air gap, an M.M.F. generator in said air gap comprising conductor means positioned about a magnetically permeable core, means for rotating said core to cause said conductor means to cut said lines of flux to generate an M.M.F. in opposition to said magnetic means, and means linked with said lines of flux so as to be responsive to variations thereof to provide an indication of the speed of rotation of said core.

4. An electric control device comprising magnetic means for producing lines of flux, control means normally biased to a first position by a force and movable to a second position by the lines of flux, an M.M.F. generator in said lines of flux, said M.M.F. generator comprising an electrical conductor and a magnetically permeable core, and means for moving said conductor and lines of flux relative to one another to produce an M.M.F. in opposition to said lines of flux to change the number of said lines of flux in a manner to shift said control means between said first and second positions.

5. The invention as defined in claim 4 wherein said M.M.F. generator comprises a cylindrical core made from a plurality of thin, disc-shaped laminations of magnetic permeable material, a plurality of circumferentially spaced axially extending conducting elements on the periphery of said core, means for electrically interconnecting said elements with one another, and means for rotating said core and magnetic means relative to one another to cause said elements to cut said lines of flux in a manner to produce said changeable M.M.F. in opposition to said magnetic means.

6. An electric control device comprising magnetic means having first spaced portions defining an air gap therebetween and second spaced portions defining an air gap therebetween, said magnetic means generating lines of flux across both of said air gaps, a rotor rotatably mounted adjacent to said first spaced portions, and control means adjacent to said second spaced portions and shiftable to a first position by the magnetic attraction thereof against a biasing force which would shift it to a second position when the magnetic attraction of said second portions is reduced, said rotor comprising a laminated magnetically permeable core having conductor elements thereon in position to cut the lines of flux between said first portions as said rotor rotates to generate an opposing M.M.F. that reduces the net lines of flux passing between said first portions as the r.p.m. of the rotor increases whereby said control means can be shifted between said first and second positions in response to changes in the lines of flux across said first portions resulting from changes in the r.p.m. of said rotor.

7. The invention as defined in claim 6 wherein said rotor comprises a cylindrical core made from a plurality of thin disc-shaped laminations, a plurality of electrical conductors extending axially across the periphery of said core in circumferentially spaced relation, a first conducting ring on one end of said core electrically interconnecting the adjacent ends of said conductors with one another, and a second conducting ring on the other end of said core electrically connecting the adjacent ends of said conductors with one another, said first mentioned portions closely overlying the periphery of said rotor.

8. The invention as defined in claim 7 wherein said magnetic means comprises a permanent magnet having a pole piece on each of the poles thereof so that one of the pole pieces is completely magnetized as a north pole and the other of said pole pieces is completely magnetized as a south pole, said pole pieces defining a first pair of spaced pole faces closely overlying the periphery of said rotor and a second pair of spaced pole faces adjacent to said control means.

9. The invention as defined in claim 8 wherein said control means comprises a movable element of permeable material adjacent said second pole faces and shiftable to said first position thereby against a spring force continuously biasing the movable element towards said second position, and electrical contact means actuated by the movement of said movable element between said first and second positions.

10. An electric control device comprising a support, a rotor rotatably mounted on said support, said rotor comprising a washer-shaped core made from a plurality of thin washer-shaped laminations of magnetic permeable material, said core having a plurality of axially extending electrical conductors circumferentially spaced about the periphery thereof with means for electrically connecting corresponding ends of said conductors with one another, a permanent magnetic unit on said support having a first spaced pair of north-south pole faces closely overlying the periphery of said rotor for producing lines of flux which are cut by said conductors as said rotor rotates to generate an opposing M.M.F. that reduces the net lines of flux between said first spaced pair of pole faces as the r.p.m. of the rotor increases, an arm pivotally mounted on said support having a portion thereof of magnetic permeable material extending across a second pair of spaced north-south pole faces of said magnetic unit, changes in the flux between said first pair of pole faces causing changes in the flux between said second pair of pole faces, said arm being pivotable to a first position by said second pair of pole faces against a spring force normally biasing it to a second position, and contact means actuated by the movement of said arm between said first and second positions.

11. The invention as defined in claim 10 wherein said permanent magnetic unit comprises a permanent magnet having elongated pole pieces on the poles thereof so that one of the pole pieces is entirely magnetized as a north pole and the other of the pole pieces is entirely magnetized as a south pole, one pair of ends of the pole pieces defining said first pair of spaced north-south pole faces and the other pair of ends of said pole pieces defining said second pair of spaced north-south pole faces.

12. The invention as defined in claim 10 wherein a plurality of said magnetic units, arms and contact means are mounted on said support in circumferentially spaced relation about said rotor.

13. The invention as defined in claim 12 wherein said force biasing each of said arms to said second position comprises a spring acting on each of said arms and adjustable means for adjusting the force which said springs exert on said arms whereby each of said contact means can be adjusted to be actuated at a different r.p.m. of said rotor.

14. A speed sensing device comprising a body having a central bore therethrough, bearing means fixed in said bore, a shaft rotatably journaled in said bore by said bearing means, a rotor mounted on said shaft for rotation within said bore, a magnetic unit embedded in said body comprising a permanent magnet having a first pair of spaced north-south pole faces and a second pair of spaced north-south pole faces, the air gap between the first pair of pole faces being exposed to said central bore and the air gap between the second pair of pole faces being exposed on one surface of said body, a movable element of magnetic permeable material mounted on said body in the air gap between said second pair of pole faces and attracted to a first position thereby against a force continuously biasing it to a second position, and contact means on said body actuated by the movement of said movable element between said first and second positions, said rotor being positioned in said first air gap and comprising a washer-shaped core made from a plurality of thin washer-shaped laminations of magnetic permeable material and a plurality of axially extending electrical conductors circumferentially spaced about the periphery of said core with means for electrically connecting corresponding ends of said conductors with one another.

References Cited by the Examiner

UNITED STATES PATENTS

| | | | |
|---|---|---|---|
| 2,187,369 | 1/1940 | Uehling | 200—87 |
| 2,480,802 | 8/1949 | Wisman et al. | 310—156 X |
| 2,504,681 | 4/1950 | Hall | 200—87 |
| 2,550,605 | 4/1951 | Schenck | 200—87 |
| 2,962,567 | 11/1960 | Rock | 200—87 |
| 3,108,163 | 10/1963 | Kripke et al. | 200—87 |

BERNARD A. GILHEANY, *Primary Examiner.*

MILTON O. HIRSCHFIELD, *Examiner.*

B. DOBECK, *Assistant Examiner.*